United States Patent [19]
Boenig et al.

[11] Patent Number: 5,454,708
[45] Date of Patent: Oct. 3, 1995

[54] FLASH REMOVAL SYSTEM FOR A MOLD

[75] Inventors: James M. Boenig; Randall R. Kuntz, both of New Braunfels, Tex.

[73] Assignee: The Coleman Company, Inc., Wichita, Kans.

[21] Appl. No.: 185,518

[22] Filed: Jan. 24, 1994

[51] Int. Cl.⁶ .................................................. B29C 45/40
[52] U.S. Cl. ........................ 425/537; 264/334; 425/556
[58] Field of Search .......................... 425/556, 537; 264/334

[56] References Cited

U.S. PATENT DOCUMENTS

| | | |
|---|---|---|
| 3,362,043 | 1/1968 | Langdon . |
| 3,363,282 | 1/1968 | Hagen . |
| 3,499,071 | 3/1970 | Hurst . |
| 3,713,764 | 1/1973 | Nelson . |
| 4,272,233 | 6/1981 | Cochran . |
| 4,295,813 | 10/1981 | Levine . |
| 4,726,925 | 2/1988 | Binder ...................................... 425/556 |
| 4,741,874 | 5/1988 | Harrison . |

FOREIGN PATENT DOCUMENTS

| 169047 | 12/1981 | Japan ..................................... 425/556 |

*Primary Examiner*—Tim Heitbrink

[57] ABSTRACT

A mold is equipped with a flash removal system for automatically removing flash from a molded part. A flash-retaining pin is mounted in one of the mold parts in the flash area outside of the pinch line so that flash flows around the pin during molding. When the mold opens, the molded part and the flash is retained against the mold part. An ejector pin in the mold part inside the pinch line is extendable to eject the molded part along the pinch line while the flash is retained by the flash retaining pin. The flash retaining pin can be retractable to allow the flash to drop off, or an extendable flash ejecting piston can be used to eject the flash.

13 Claims, 3 Drawing Sheets

FLASH REMOVAL SYSTEM FOR A MOLD

BACKGROUND AND SUMMARY

This invention relates to an automatic flash removal system for a mold. Historically excess flash or scrap which is formed during a molding operation has been removed manually or mechanically outside of the mold. The flash removal step requires additional time and/or labor and can increase the mold cycle time.

The invention provides for automatic flash removal inside of the mold without manual intervention. The mold can be operated continuously without stoppage for removing molding parts without flash, and molded parts do not have to be deflashed manually.

During molding flash forms around a flash retaining pin which is mounted on one of the mold parts in the flash area outside of the pinch line. The flash retaining pin holds the flash and the molded part against the mold when the mold opens, and a reciprocable ejector pin inside of the pinch line extends to break the molded part away from the flash along the pinch line while the flash is held by the flash retaining pin. The flash is automatically ejected by withdrawing the flash retaining pin or by extending a separate flash ejecting pin.

DESCRIPTION OF THE DRAWING

The drawing will be explained in conjunction with illustrative embodiments shown in the accompanying drawing, in which.

DESCRIPTION OF SPECIFIC EMBODIMENT

Figure 1:
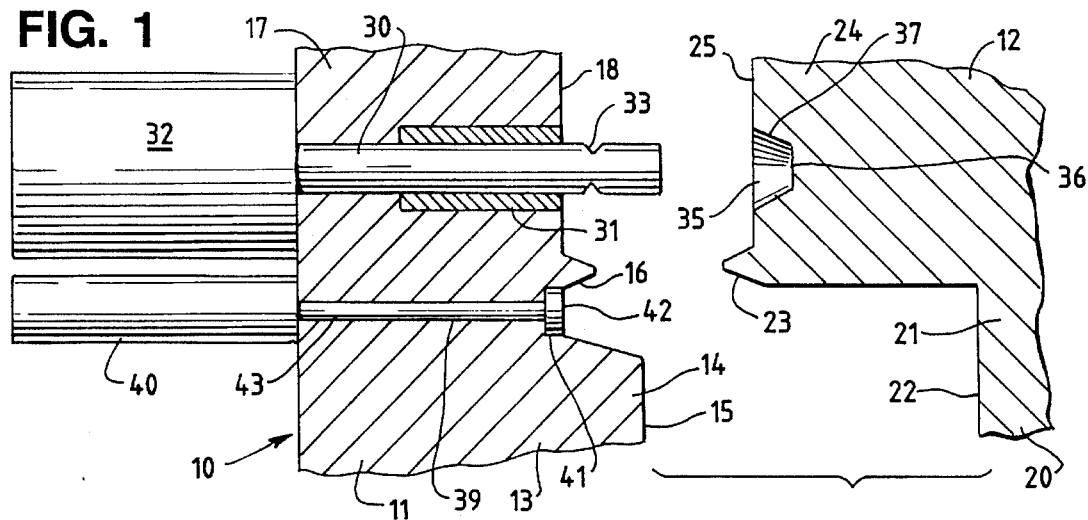
FIG. 1 is a fragmentary sectional view of a two-part mold with the mold in the open position.
Figure 2:
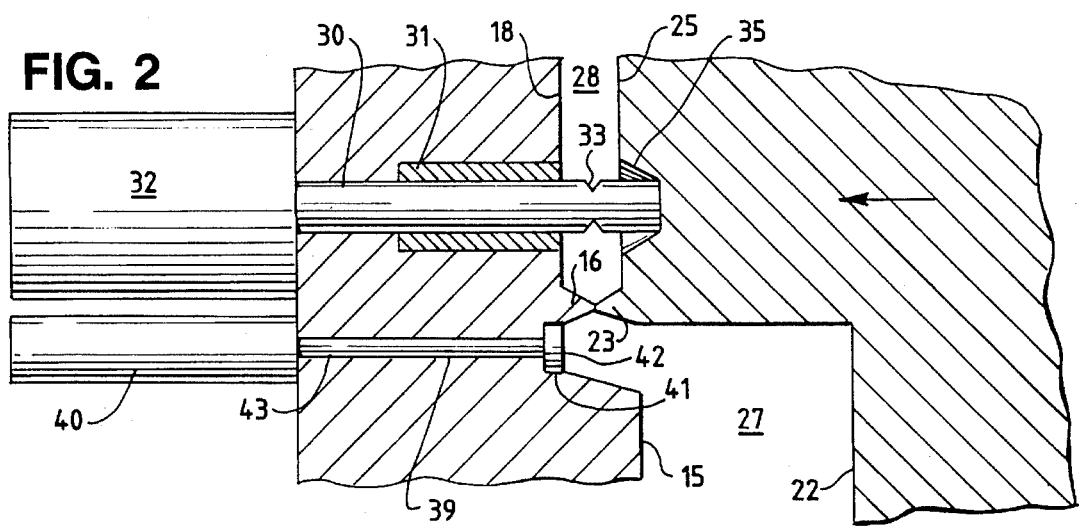
FIG. 2 is a view similar to FIG. 1 with the mold closed.

Referring to FIGS. 1 and 2, a two-part mold 10 includes a first mold part 11 and a second mold part 12. The mold parts can be conventional except for the flash removal system which will be described hereinafter. The mold parts are mounted for relative reciprocal movement between an open position illustrated in FIG. 1 and a closed position illustrated in FIG. 2.

The mold part 11 includes a body portion 13, a central cavity portion 14 which includes a mold cavity surface 15, a pinch portion 16 which extends around at least a portion of the cavity portion, and a flash portion 17 which includes a flash cavity surface 18 outside of the pinch portion 16.

The mold part 12 similarly includes a body portion 20, a cavity portion 21 with a mold cavity surface 22, a pinch portion 23, and a flash portion 24 with a flash cavity surface 25.

When the mold is closed (FIG. 2), the mold cavity surfaces 15 and 22 form a mold cavity 27 which is shaped to form the desired molded part. The pinch portions 16 and 23 are adjacent each other, but a slight space remains between the two pinch portions so that excess plastic material can flow out of the mold cavity. The two flash cavity surfaces 18 and 25 form a flash cavity 28 outwardly of the pinch portions 16 and 23.

The particular mold illustrated is a blow mold, and the pinch portions 16 and 23 are designed to pinch off the parison after the parison is positioned between the mold halves. However, it is possible that the invention could also be used with other types of molds, for example, injection molds, and the pinch portions can be provided by the portions of the mold which form the parting line.

One or more flash retaining pistons or pins 30 are reciprocably mounted in the flash portion 17 of the mold part 11. In the particular embodiment illustrated, the piston is slidably mounted in a cylindrical hardened steel bushing 31. The piston can be extended and retracted by a dual acting pneumatic or hydraulic cylinder 32 or other conventional devices. The piston 30 is movable between an extended position illustrated in FIGS. 1 and 2 and a retracted position illustrated in FIG. 6. In the retracted position the outer end 32 of the piston is substantially flush with the flash cavity surface 18. The piston is provided with a notch groove, or undercut 33 for receiving and retaining flash as will be described hereinafter. Undercuts may be positioned on any portion of the piston which extends beyond the mold surface when the piston is extended.

The mold part 12 is provided with a recess 35 which is aligned with the piston 30. The piston projects into the recess when the mold is closed (FIG. 2). The particular recess illustrated has a bottom wall 36 which has substantially the same diameter as the piston, and a frustoconical side wall 37 which diverges at an angle of about 4° to 6° from the axis of the piston. However, other shapes of recesses can be used.

One or more ejection pins or pistons 39 are reciprocably mounted in the mold part 11 inwardly of the pinch portion 16. The piston 39 can be extended and retracted by a double acting cylinder 40 or similar device. The piston 39 includes a head 41 having an outer surface 42 and a shaft 43 which extends through the mold part. The piston is movable between a retracted position illustrated in FIG. 1 in which the outer surface 42 is flush with the cavity surface 15 and an extended position illustrated in FIG. 5 in which the piston extends into the mold cavity 27.

Figure 3:
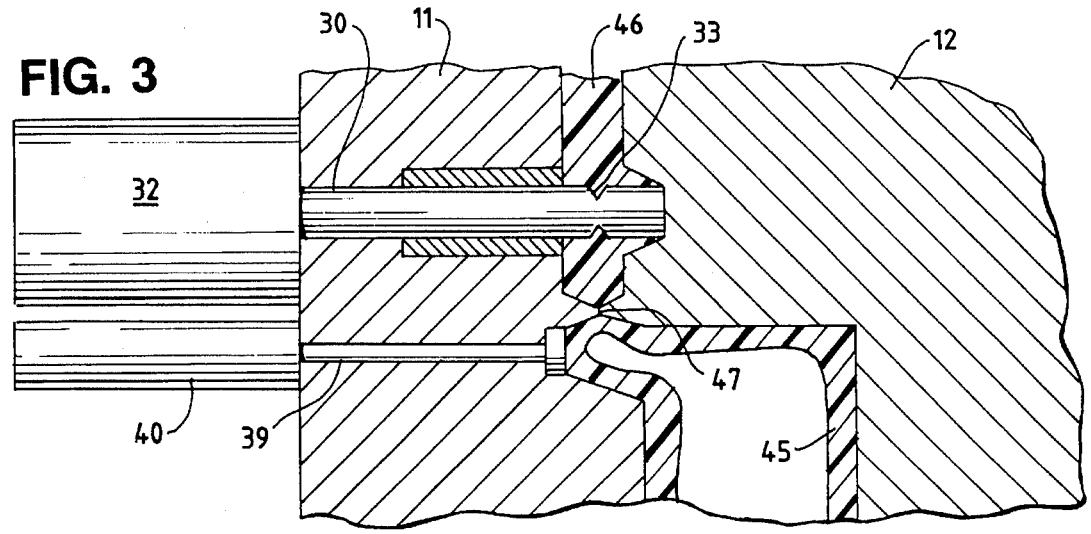
FIG. 3 illustrates the closed mold filled with plastic.

During operation a parison of plastic material is positioned between the mold parts 11 and 12, and the mold parts are closed so that the parison is pinched by the pinch portions 16 and 23. The parison is expanded against the mold activity surfaces by pressurized air to form a molded part 45 (FIG. 3). The portion of the parison which extends outwardly beyond the pinch portions forms flash 46. The flash is compressed by the mold parts within the flash cavity 28 and is forced to flow around the piston 30 and into the groove 33 and the recess 35.

Figure 4:
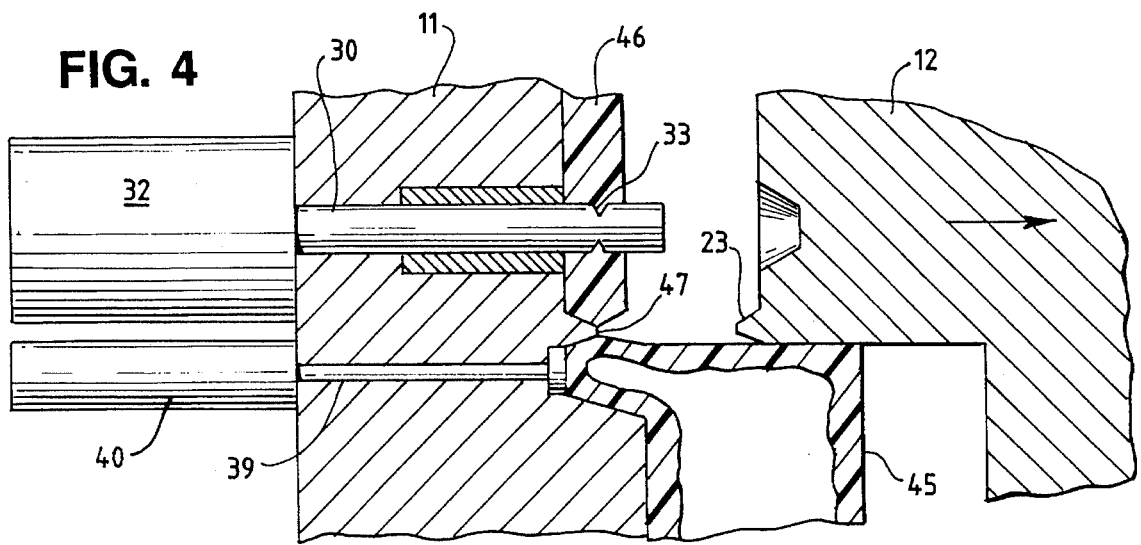
FIG. 4 illustrates the open mold after the molding step.

The mold is temperature controlled to cure and harden the plastic, and after curing the mold parts are separated as shown in FIG. 4. The flash 46 and the molded part 45 are retained against the mold part 11 by the flash retaining piston 30. Retention of the flash is assisted by the groove 33 which provides a mechanical interlock between the piston and the flash. The molded part and the flash are connected by a thin web of plastic or pinch line 47 which is formed by the pinch portions 16 and 23.

Figure 5:
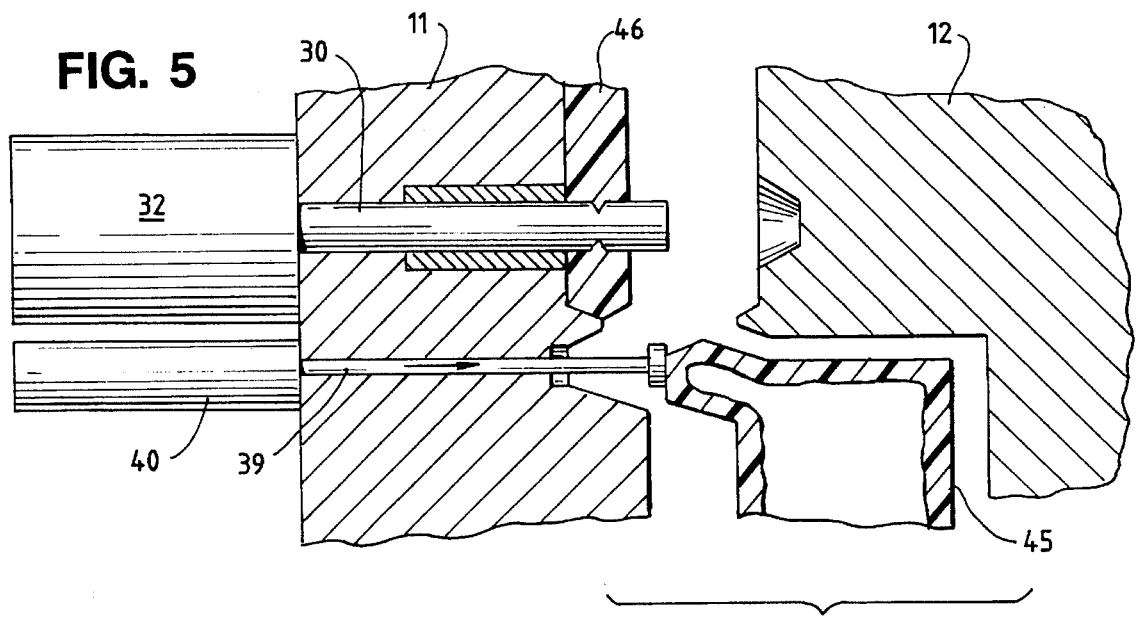
FIG. 5 illustrates the molded part being broken away from the flash.

After the mold is opened, or during the opening step, the ejection piston 39 is extended to push the molded part 45 away from the mold cavity surface 15 as illustrated in FIG. 5. The flash 46 is held by the flash retaining piston 30, and the molded part breaks away from the flash along the thin pinch line or parting line 47 and is ejected from the open mold.

Figure 6:
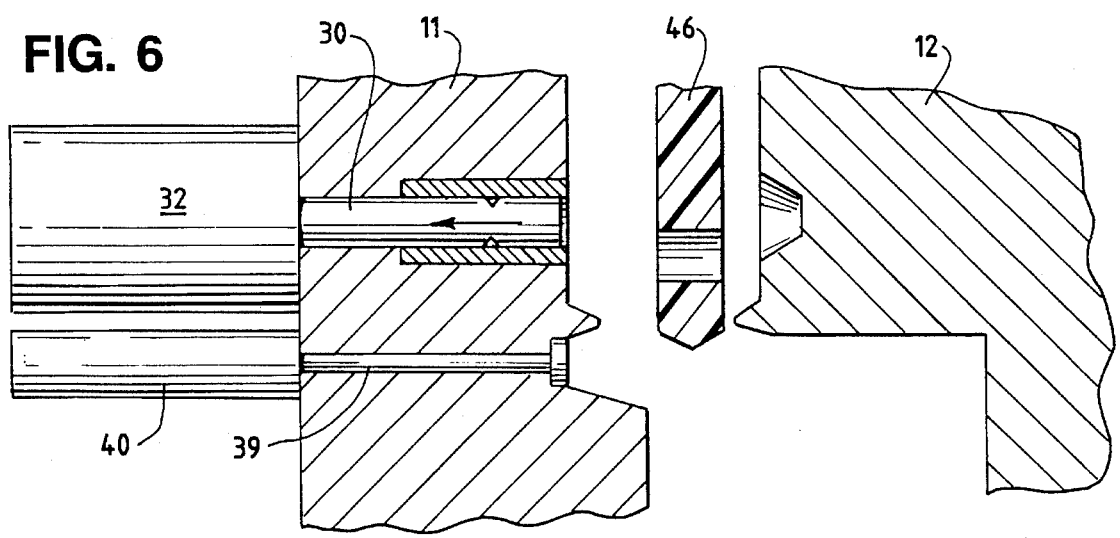
FIG. 6 illustrates the flash being ejected.

After the molded part is ejected, the flash retaining piston 30 is retracted as shown in FIG. 6. The portion of the flash in the groove 33 is fractured, stripped, or stretched from the groove as the piston retracts. When the piston is fully retracted, the flash falls out of the mold by gravity. The flash is thereby automatically removed from the molded part and removed from the mold without manual intervention. The mold is then ready to begin a new cycle.

Figure 7:
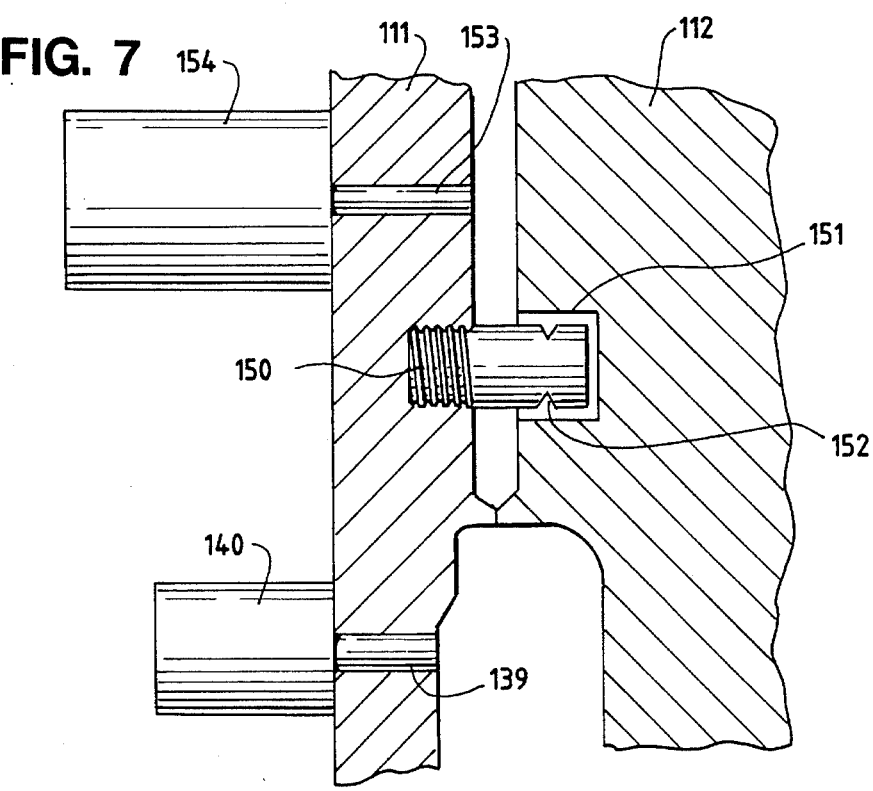
FIG. 7 illustrates another embodiment of a flash removal system.

Another embodiment of a flash removal system is illustrated in FIG. 7. The mold in FIG. 7 is similar to the mold in FIG. 1, and like parts are indicated by like reference numerals increased by 100.

The embodiment of FIG. 7 includes a stationary flash retaining pin 150 rather than a reciprocating piston. The pin 150 is secured to the mold part 111 and extends into a recess 151 in the mold part 112. The pin is provided with a groove or undercut 152 for providing a mechanical interlock with the flash. A flash ejecting piston 153 is reciprocably mounted in the mold part 111 and is operable by a cylinder 154.

During the molding operation plastic material flows around the flash retaining pin 150 and into the groove 152. After the plastic hardens, the mold is opened and the molded part and the flash is retained by the pin 150. The molded part is knocked out along the pinch line by extending the piston 139, and the flash is thereafter ejected by extending the piston 153 to force the flash away from the pin 150.

Depending upon the size and shape of the molded part, one or more ejecting pistons 39 are used. The ejecting pistons are preferably located near the pinch line or parting line. One or more flash retaining pistons or pins are also used depending upon the shape of the flash.

While in the foregoing specification, a detailed description of a specific embodiments of the invention was set forth for the purpose of illustration, it will be understood that many of the details herein given may be varied considerably by those skilled in the art without departing from the spirit and scope of the invention.

We claim:

1. A molding apparatus comprising:

first and second mold parts which are movable between an open position and a closed position in which the mold parts provide a mold cavity, a flash cavity, and a pinch line between the mold cavity and the flash cavity, flash retaining means on one of the mold parts which extends into the flash cavity for holding flash against said one mold part when the mold parts move to the open position, and ejection means on one of the mold parts which is extendable into the mold cavity while the flash is held by the flash retaining means for pushing a molded part away from a surface of the mold cavity and separating the molded part from the flash along the pinch line.

2. The mold apparatus of claim 1 in which said flash retaining means comprises a piston which is reciprocably mounted in said one mold part and which is movable between a first flash-retaining position in which the piston extends into the flash cavity and a second flash-removing position in which the piston is withdrawn into said one mold part.

3. The mold apparatus of claim 2 in which said piston is provided with a groove for receiving flash.

4. The mold apparatus of claim 2 in which the other mold part is provided with a recess into which said piston extends when the piston is in the flash-retaining position and the mold parts are closed.

5. The mold apparatus of claim 1 in which said flash retaining means comprises a pin which is mounted on said one mold part, and a flash-ejecting piston reciprocably mounted in said one mold part and which is movable between a first position in which the piston is withdrawn into said one mold part and a second position in which the piston extends into the flash cavity.

6. The mold apparatus of claim 5 in which the other mold part is provided with a recess into which said pin extends when the mold parts are closed.

7. The mold apparatus of claim 1 in which said ejection means includes a piston which is reciprocably mounted in one of the mold parts and which is movable between a first position in which the piston is withdrawn into the mold part and a second position in which the piston extends into the mold cavity.

8. A molding apparatus comprising:

a first mold part having a body, an inner cavity portion formed in the body, a pinch portion extending around at least a portion of the cavity, and a flash portion positioned outwardly of the pinch portion, a second mold part having a body, an inner cavity portion formed in the body, a pinch portion extending around at least a portion of the cavity, and a flash portion positioned outwardly of the pinch portion, the first an second mold parts being movable between an open position and closed position in which the pinch portions thereof are adjacent each other and the cavity portions provide a mold cavity and the flash portions thereof provide a flash cavity, a flash retaining piston reciprocably mounted in the first mold part outwardly of the pinch portion and being movable between a flash-retaining position in which the piston extends into the flash cavity when the mold parts are closed and a flash-ejecting position in which the piston is withdrawn into the first mold part, and an ejection piston reciprocably mounted in the first mold part inwardly of the pinch portion and being movable between a first position in which the piston is withdrawn into the first mold part and an ejecting position in which the piston extends into the cavity portion of the first mold part while flash is held by the flash retaining piston for pushing a molded part away from a surface of the first mold part and separating the molded part from the flash in the flash cavity.

9. The mold apparatus of claim 8 in which the flash retaining piston is provided with a groove for receiving flash.

10. The mold apparatus of claim 8 in which the second mold part is provided with a recess outwardly of the pinch portion, the flash retaining piston extending into said recess when the mold parts are closed and the flash retaining piston is in the flash retaining position.

11. The mold apparatus of claim 10 in which said recess in the second mold part is larger than the flash retaining piston whereby flash can flow around the piston in the recess.

12. The mold apparatus of claim 11 in which said recess in the second mold part includes a frustoconical side wall.

13. A blow molding apparatus comprising:

first and second blow mold parts which are movable between an open position and a closed position in which the mold parts provide a mold cavity, a flash cavity, and a pinch line between the mold cavity and the flash cavity, flash retaining means on one of the mold parts which extends into the flash cavity for holding flash against said one mold part when the mold parts move to the open position, and ejection means on one of the mold parts which is extendable into the mold cavity while the flash is held by the flash retaining means for pushing a molded part away from a surface of the mold cavity and separating the molded part from the flash along the pinch line.

* * * * *